United States Patent
Henness

Patent Number: 5,934,118
Date of Patent: Aug. 10, 1999

[54] SECURITY DEVICE FOR LOCKING A VEHICLE WHEEL

[76] Inventor: Douglas L. Henness, 7870 Winding Way South, Tipp City, Ohio 45371

[21] Appl. No.: 09/081,630

[22] Filed: May 19, 1998

Related U.S. Application Data

[60] Provisional application No. 60/047,644, May 22, 1997.

[51] Int. Cl.[6] ............................................. B60R 25/00
[52] U.S. Cl. ............................. 70/226; 70/232; 70/237
[58] Field of Search ........................... 70/225–227, 229, 70/230, 232, 260, 209–212, 207, 237, 238, 258, 259, 166–169, 163, 14, 18; 188/32

[56] References Cited

U.S. PATENT DOCUMENTS

| | | | |
|---|---|---|---|
| 967,308 | 8/1910 | Barr | 70/15 |
| 1,396,067 | 11/1921 | Setkowski. | |
| 3,995,461 | 12/1976 | Hudson | 70/259 |
| 4,819,462 | 4/1989 | Apsell | 70/14 |
| 4,878,366 | 11/1989 | Cox | 70/14 |
| 4,888,969 | 12/1989 | Suroff | 70/226 |
| 5,214,944 | 6/1993 | Wolthoff | 70/226 |
| 5,301,527 | 4/1994 | Pollard | 70/226 |
| 5,353,614 | 10/1994 | Anderson | 70/209 |
| 5,437,171 | 8/1995 | Owen | 70/14 |
| 5,537,847 | 7/1996 | Dalton et al. | 70/209 |
| 5,595,078 | 1/1997 | Harrell | 70/209 |
| 5,605,063 | 2/1997 | Taurog | 70/209 |
| 5,619,873 | 4/1997 | Wood | 70/209 |
| 5,697,235 | 12/1997 | Briones | 70/209 |
| 5,826,448 | 10/1998 | Graham | 70/209 |

FOREIGN PATENT DOCUMENTS

| | | | |
|---|---|---|---|
| 2037242 | 7/1980 | United Kingdom | B06R 25/00 |
| 2091182 | 7/1982 | United Kingdom | B60S 9/00 |

*Primary Examiner*—Suzanne Dino Barrett
*Assistant Examiner*—Teri Pham
*Attorney, Agent, or Firm*—Biebel & French

[57] ABSTRACT

A security device for preventing rotation of a wheel on a vehicle, such as a trailer. The security device includes a base member attachable to the vehicle wheel and a cover member for positioning over the base member wherein the cover member supports a bar extending beyond the radius of the vehicle wheel. The base member and cover member are formed having a cooperating non-circular shape whereby the cover member is prevented from rotating relative to the base member.

13 Claims, 3 Drawing Sheets

SECURITY DEVICE FOR LOCKING A VEHICLE WHEEL

RELATED APPLICATION

This application claims the benefit of prior U.S. provisional application Ser. No. 60/047,644, filed on May 22, 1997.

BACKGROUND OF THE INVENTION

1. Field of the Invention

This invention relates generally to a vehicle security device and, more particularly, to a security device which is adapted to fasten to a vehicle wheel in order to prevent rotation of the wheel.

2. Description of the Prior Art

In recent years, security devices for preventing theft of personal belongings have found an increasing demand. This is particularly true with the increase in theft of vehicles, including small trailers, such as boat trailers, utility trailers and other privately owned trailers. An example of one such theft prevention device is a lock located on the tongue hitch of the trailer which prevents the hitch from being attached in engagement with a hitch ball of a towing vehicle. However, the tongue hitch lock has proven ineffective at preventing the theft of trailers.

In the past several years, devices have been proposed for attachment to the wheels of trailers in order to prevent rotation of the wheels and thus immobilize the trailer. For example, UK Patent Application 2,037,242 discloses a wheel locking device comprising a base plate having key hole slots for engaging with special flange headed wheel nuts. The base plate includes an arm which extends beyond the periphery of the vehicle wheel to prevent rotation of the wheel. In this device the flanged top of the lug nuts are exposed, and therefore accessible from the top of the base plate.

U.S. Pat. No. 5,301,527 discloses another security device for preventing rotation of a vehicle wheel. This security device includes a base plate bolted to the vehicle wheel and a cover positioned over the back plate with a security bar sandwiched between the base plate and cover and extending beyond the periphery of the wheel to prevent rotation. The bar includes studs engaging within apertures in the back plate to prevent rotation of the bar. Accordingly, the ability of the bar to resist rotation is dependant upon the sheer strength of the studs.

There remains a need for a vehicle security device for use with trailers which is constructed with sufficient strength to resist even abusive force during a would-be theft of a trailer. There is a further need for such a device wherein a minimum of detachable parts are incorporated into the device to thereby minimize the risk of losing critical operating parts when the device is not in use.

SUMMARY OF THE INVENTION

The present invention provides a security device for preventing rotation of a wheel on a vehicle, such as a trailer, wherein the wheel has a predetermined radius and a plurality of lug connectors for attaching the wheel to a vehicle hub. The security device generally includes a base member and a cover member cooperating with each other to hold a rigid, elongated bar in place extending beyond the radius of the vehicle wheel. The base member extends axially from the face of the wheel and defines a peripheral base member wall surrounding the lug connectors for the wheel. The cover member includes a cover plate and a peripheral cover member wall extending perpendicularly from the cover plate. The cover member wall engages the base member wall in telescoping relation, and a lock member is provided extending through apertures in the base member and cover member walls to hold the base member and cover member in engagement with each other.

The base member and cover member walls are formed as non-circular members such that the cover member is non-rotatable in relation to the base member when the two members are engaged with each other. Thus, the elongated bar, which is attached to the cover member, is held in non-rotatable relation to the wheel. The walls of the base member and cover member are preferably formed by a plurality of contiguous planar wall sections defining a polygon shape, such as a pentagon, wherein the base and cover member wall sections cooperate with each other to prevent relative rotation.

Therefore, it is an object of the present invention to provide a security device for use with a vehicle, such as a trailer, to prevent rotation of at least one wheel of the vehicle.

It is another object of the invention to provide a security device including a bar extending beyond the radius of the vehicle wheel wherein the bar may be detachably mounted to the wheel.

It is yet another object of the invention to provide such a security device including interengaging members for securely holding the bar in place on the wheel.

Other objects and advantages of the invention will be apparent from the following description, the accompanying drawings and the appended claims.

DETAILED DESCRIPTION OF THE PREFERRED EMBODIMENT

Figure 1:
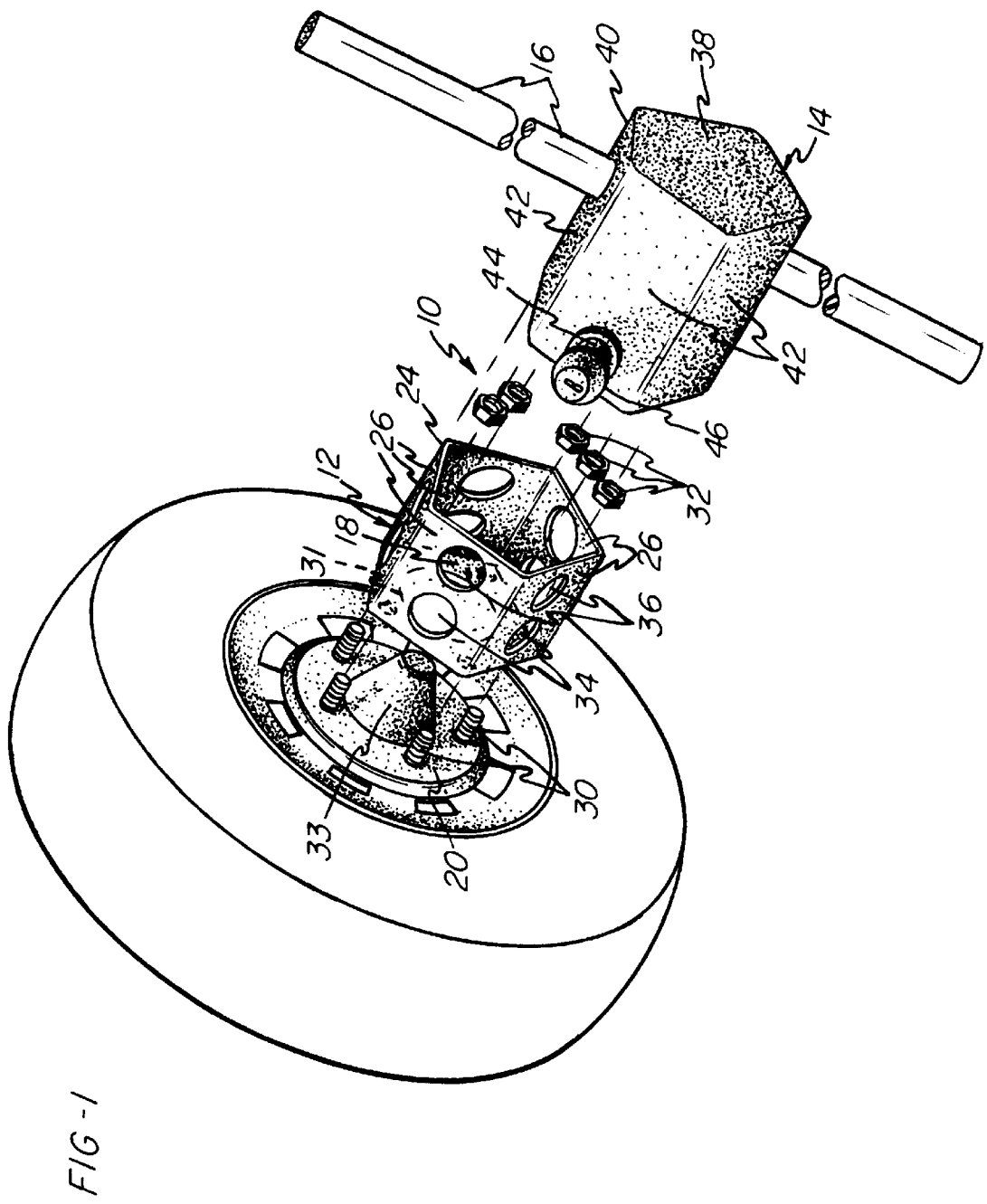
FIG. 1 is an exploded perspective view showing the security device of the present invention prior to installation on a vehicle wheel.
Figure 2:
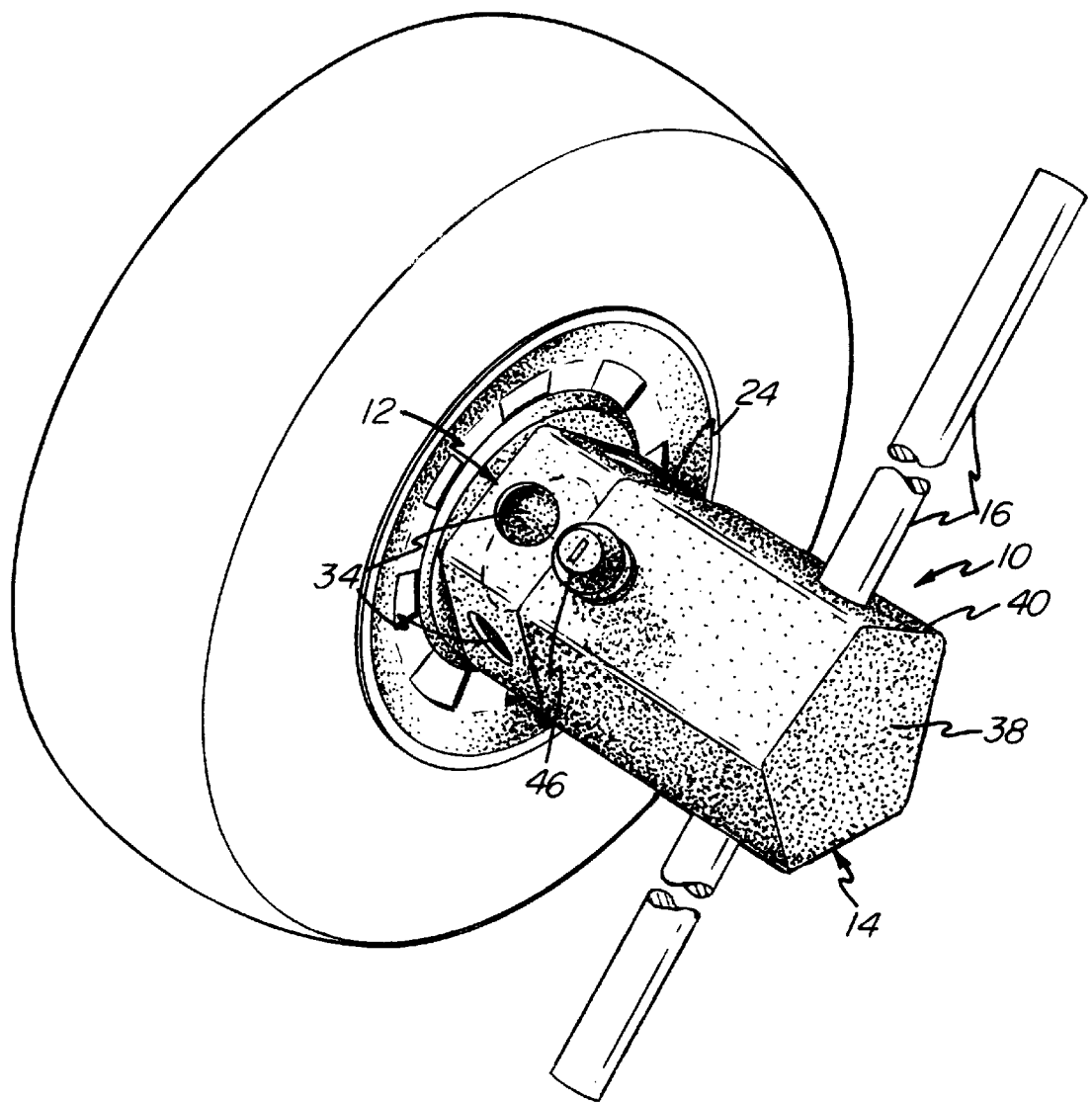
FIG. 2 is a perspective view showing the security device installed on a vehicle wheel.
Figure 3:
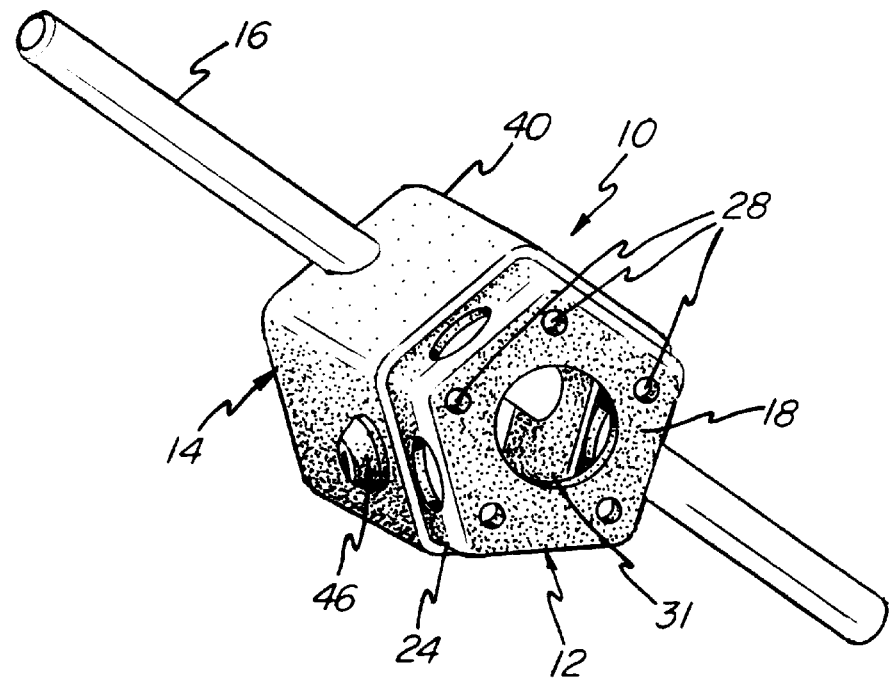
FIG. 3 is a rear perspective view showing the components of the security device assembled in telescoping relation.

Referring to FIGS. 1–3, the security device 10 of the present invention generally includes a base member 12, a cover member 14 and a rigid, elongated bar 16 supported on the cover member 14.

The base member 12 includes a substantially planar base plate 18 which is adapted to engage a central wheel rim portion 20 of a vehicle wheel 22. In particular, the base member 12 is adapted to be mounted to a vehicle wheel 22 of the type used for trailers, such as boat trailers, utility trailers and the like.

The base member 12 further includes a peripheral base member wall 24 which is formed by a plurality of contiguous planar wall sections 26 extending perpendicularly from the base plate 18. The wall sections 26 define a polygonal shape for the base member wall 24, and in the embodiment shown define a pentagon shape.

The base plate 18 includes a plurality of apertures 28 for receiving respective lugs 30 provided for mounting the wheel 22 to a vehicle hub. An additional aperture 31 is provided centrally on the base plate 18 for receiving a central hub portion 33 of a vehicle axle. The base plate 18 is held in place against the wheel rim 20 by means of lug nuts 32 engaging the lugs 30 passing through the apertures 28. With the base plate 18 thus positioned against the wheel rim 20, the base member wall 24 is located to extend axially outwardly from the wheel rim 20.

Each of the wall sections 26 forming the base member wall 24 include first and second apertures 34 and 36, respectively. The apertures 34 form a first set of apertures which are spaced a predetermined first distance, in an axial direction, from the base plate 18. The second apertures 36 define a second set of apertures spaced a second predetermined distance, in an axial direction, from the base plate 18 wherein the second predetermined distance is greater than the first predetermined distance. The purpose of the first and second apertures will be described below in relation to the operation of the cover member 14.

The cover member 14 includes a substantially planar cover plate 38, and a peripheral cover member wall 40 extending perpendicularly from the cover plate 38. The cover member wall 40 is formed by a plurality of contiguous planar wall sections 42 defining a polygonal shape matching the polygonal shape of the base member wall 24. The bar 16, which is preferably a tubular bar, extends through apertures in two of the wall sections 42 at locations adjacent to the cover plate 38, and is rigidly attached to the wall sections 42 by welding, or by retention clips or pins extending radially from the surface of the bar 16 and engaged with the interior surface defined by the wall sections 42 to resist longitudinal sliding of the bar 16.

The cover member 14 includes a further aperture 44 for receiving a lock member in the form of a cylinder lock 46 therethrough. The cylinder lock is of a conventional design, and is actuated by a key 48 to move locking tangs 50 (FIG. 4) radially relative to the cylinder lock 46.

In use, the base member 12 is mounted to the vehicle using the vehicle lug connectors including the lugs 30 and lug nuts 32, as described above. With the base member 12 thus mounted, the cover member 14 is moved into position over the base member 12 with the cover member wall 40 located in telescoping relation over the base member wall 24. As the cover member 14 is moved over the base member 12, the aperture 44 is aligned with one of the first and second apertures 34, 36, and the cylinder lock 46 is inserted downwardly through the aligned aperture 34, 36 to lock the cover member 14 in a desired axial position relative to the base member 12. The tangs 50 on the cylinder lock 46 prevent the cylinder lock 46 from being withdrawn from engagement with the base member 12 until the tangs 50 are actuated to move radially inwardly by a key 48.

Figure 4:
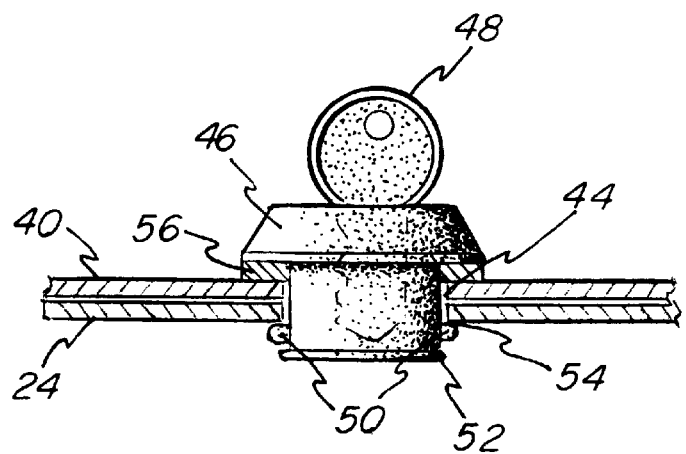
FIG. 4 is a partial cross-sectional view illustrating the lock member for the security device.

As seen in FIG. 4, the cylinder lock 46 may be provided with an end flange 52 extending beyond the radius of the cylindrical cylinder body 54. In addition, the cover member wall 40 may be provided with a ring member 56 at the aperture 44 wherein the inner diameter of the ring member 56 is sufficient to permit sliding movement of the cylinder body 54, but prevents passage of the flange 52. Thus, when unlocked, the cylinder lock 46 may be withdrawn from engagement with the base member wall 24, but will be held against removal from the cover member wall 40 by interengagement between the flange 52 and the ring member 56. In this manner, the cylinder lock 46 will be prevented from being removed and potentially lost during use of the security device 10.

The base member 12 is provided with the first and second sets of apertures defined by apertures 34 and 36 in order to provide alternative axial positioning of the cover member 14 relative to the vehicle wheel 22. Specifically, while it is generally desirable to align the aperture 44 of the cover member 14 with the first aperture 34 of the base member 12, to position the bar 16 as close as possible to the wheel 22, it may be necessary to position the bar 16 such that it does not interfere with a fender of the vehicle. In such a case, the aperture 44 of the cover member 14 may be aligned with the second aperture 36 in order to permit proper clearance with the body parts of the vehicle. In addition, the aperture 36 may also be used when necessary to accommodate a wheel 22 having a deeper wheel rim 20.

It should be noted that the bar 16 is provided with a length such that only one end or both ends of the bar 16 extend a distance from the cover member 14 greater than the radius of the wheel 22, and is preferably 36 inches long, but may be of any length sufficient to ensure that at least one end of the bar 16 extends beyond the radius of the wheel. Thus, at least one end of the bar 16 is adapted to extend beyond the outer diametrical edge of the wheel 22 whereby rotation of the wheel will cause engagement of the bar with the ground to thereby prevent rotation of the wheel.

It should be apparent from the above description that the base member 12 and cover member 14 are formed as shell-like structures which interfit with each other. The shell-like design of the present invention provides a strong structure which resists deformation of the base and cover members 12, 14 upon application of forces to the cover member 14.

It should also be apparent that the base member 12 and cover member 14 are provided with cooperating non-circular shapes whereby the cover member is rigidly held against rotation relative to the base member 12. Further, alternative non-circular configurations may be provided for the base member 12 and cover member 14 without departing from the scope of the present invention.

In addition, it should also be noted that the base member may alternatively be permanently attached to the vehicle wheel by conventional means such as welding, or may be integrally formed with the vehicle wheel rim during construction of the wheel rim.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A security device for preventing rotation of a wheel on a vehicle, such as a trailer, the wheel having a predetermined radius and a plurality of lug connectors for attaching the wheel to a vehicle hub, said security device comprising:

a base member for extending axially from a face of the wheel and defining a peripheral base member wall surrounding the lug connectors;

a cover member including a cover plate and a peripheral cover member wall extending perpendicularly from said cover plate, said cover member wall engaging said base member wall in telescoping relation;

a rigid, elongated bar rigidly attached to said cover member, said bar having a length extending from said cover member such that an end of said bar will extend beyond an outer edge of the wheel to which the security device is mounted;

a lock member engaged between said cover member and said base member to lock said cover member in engagement with said base member; and wherein said base member wall and said cover member wall comprise cooperating non-circular members whereby said cover member is held in non-rotatable relation to said base member.

2. The security device of claim 1 wherein each of said base member wall said cover member wall includes at least one planer wall portion, said planar wall portions cooperating with each other to prevent relative rotation between said cover member and said base member.

3. The security device of claim 1 wherein said base member wall and said cover member wall are formed with a polygonal shape whereby relative rotation between said cover member and said base member is prevented.

4. The security device of claim 1 wherein said base member includes a base plate, and said base plate includes apertures for receiving said lug connectors whereby said base member is mounted to the wheel.

5. The security device of claim 1 wherein said base member wall and said cover member wall include aligned apertures and said lock member extends through said aligned apertures.

6. The security device of claim 5 wherein said base member wall includes a plurality of apertures located in circumferentially spaced relation to each other for receiving said lock member.

7. The security device of claim 6 wherein said base member includes a base plate at one end thereof and said base member wall includes a first set of circumferentially spaced apertures located at a first predetermined axial distance from said base plate and a second set of circumferentially spaced apertures located at a second predetermined axial distance from said base plate, and wherein said second predetermined distance is greater than said first predetermined distance.

8. The security device of claim 5 wherein said lock member comprises a cylinder lock actuated by a key.

9. The security device of claim 1 wherein said bar p asses through said cover member at two circumferentially spaced locations.

10. A security device for preventing rotation of a wheel on a vehicle, such as a trailer, the wheel having a predetermined radius and a plurality of lug connectors for attaching the wheel to a vehicle hub, said security device comprising:

a base member extending axially from a face of the wheel and including a substantially planar base plate having apertures for receiving the lug connectors whereby said base member is mounted to the wheel, and including a peripheral base member wall extending perpendicularly from said base plate and surrounding the lug connectors, said base member wall including a plurality of contiguous planar wall sections defining a polygonal shape for said base member wall;

a cover member including a substantially planar cover plate and a peripheral cover member wall extending perpendicularly from said cover plate, said cover member wall including a plurality of contiguous planar wall sections defining a polygonal shape matching said polygonal shape of said base member wall, and said cover member wall engaging said base member wall in telescoping relation;

a rigid, elongated bar rigidly attached to said cover member and extending through two of said wall sections of said cover member, said bar having a length extending from said cover member such that an end of said bar will extend beyond an outer edge of the wheel to which the security device is mounted;

said base member including at least one aperture extending through one of said wall sections of said base member;

said cover m ember including an aperture extending through one of said wall sections of s aid cover member and aligned with said aperture in said base member; and a lock member extending through said apertures in said base member and said cover member to lock said cover member in engagement with said base member.

11. The security device of claim 10 including an additional aperture extending through one of said wall sections of said base member, said additional aperture spaced a greater distance from said base than a distance of said at least one aperture from said base plate and dimensioned to receive said lock member.

12. The security device of claim 10 wherein each of said wall sections of said base member includes first and second apertures dimensioned to receive said lock member, and said first apertures are spaced a first predetermined distance from said base plate and said second apertures a spaced a second predetermined distance from said base plate greater than said first predetermined distance.

13. The security device of claim 10 wherein said lock member is a cylinder lock actuated by a key.

\* \* \* \* \*